No. 670,869. Patented Mar. 26, 1901.
C. H. CLEMENT.
CLUTCH FOR ADJUSTING RODS FOR ADJUSTABLE-BACK CHAIRS, &c.
(Application filed Apr. 27, 1900.)
(No Model.)
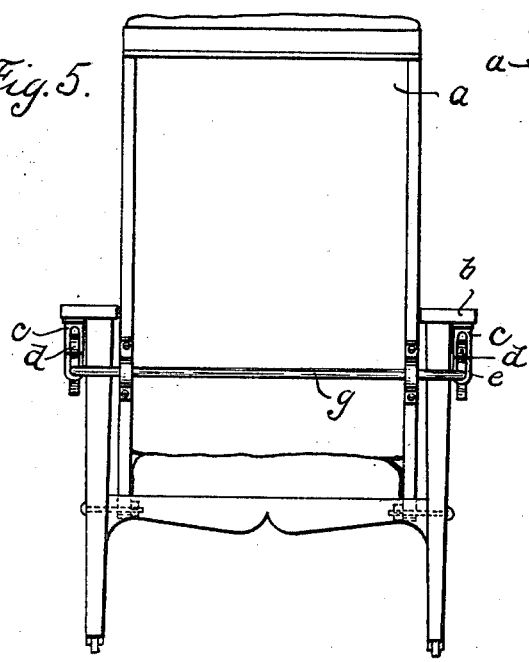
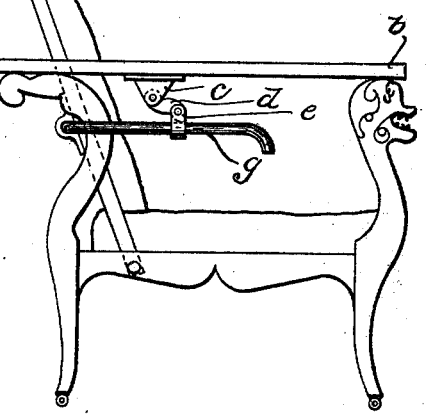
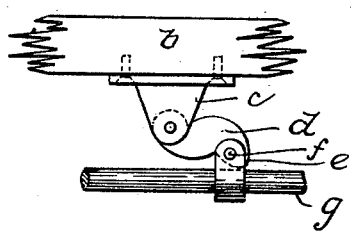
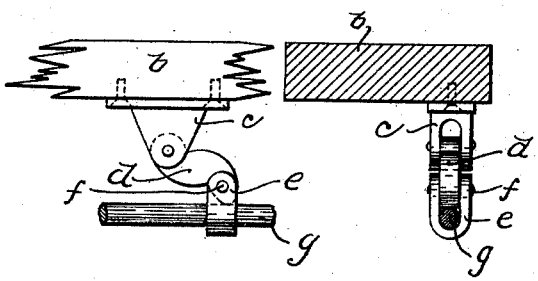
Witnesses:
Milton M. Alexander.
May W. Label.
Inventor:
Christopher H. Clement,
By Charles A. Brown Cragg
Attorneys.
THE NORRIS PETERS CO., PHOTO-LITHO., WASHINGTON, D. C.

UNITED STATES PATENT OFFICE.

CHRISTOPHER H. CLEMENT, OF CHICAGO, ILLINOIS.

CLUTCH FOR ADJUSTING-RODS FOR ADJUSTABLE-BACK CHAIRS, &c.

SPECIFICATION forming part of Letters Patent No. 670,869, dated March 26, 1901.

Application filed April 27, 1900. Serial No. 14,595. (No model.)

*To all whom it may concern:*

Be it known that I, CHRISTOPHER H. CLEMENT, a citizen of the United States, residing at No. 5519 Monroe avenue, in the city of Chicago, county of Cook, and State of Illinois, have invented a new and Improved Rod-Clutch for Adjusting-Rods for Adjustable-Back Chairs or Like Articles, of which the following is a specification.

My invention relates to furniture having adjustable backs—as, for example, Morris reclining-chairs—and has for its object the provision of improved means whereby the degree of inclination of the back may be readily adjusted by the occupant of the chair.

My invention has for a further object the provision of improved clutching mechanism that is particularly adaptable for use in connection with swinging or adjustable back chairs, &c.; but the clutch may, however, have other application.

By means of my invention I am enabled to provide an easy and perfect adjustment of the back at any desired angle, this adjustment when secured being automatically maintained by the engagement of the members of the clutch. This engagement may be readily broken when it is desired to reëffect an adjustment.

In the preferred embodiment of my invention I employ a clutch-rod underneath each arm of the chair, the clutch-rods being preferably secured to the swinging back, a second clutch member in the form of a link being mounted under each arm and normally serving to frictionally engage the clutch-rods to maintain the back in any of its adjusted positions, one end of the link having pivotal connection with its support, while the other end is provided with a cam and is pivotally connected with a collar through which the clutch-rod is passed, the collar and cam coacting to grip the clutch-rod to secure the swinging back in any of its adjustments, the clutch being preferably so constructed that a slight upward pressure upon the clutch-rods will release the engagement thereof with their corresponding clutch members and permit the rearward adjustment of the back. By means of the preferred embodiment of my invention the forward adjustment of the back may be secured without manipulating the clutches, which readily permit the forward movement of the back, but, due to the weight of the rods and the back attached thereto, prevent a rearward movement of the back unless the clutches are manipulated.

I will explain my invention more fully by reference to the accompanying drawings, in which—

Figure 1 is a side view of a reclining-chair with the device of my invention in place. Fig. 2 is a detailed view of the clutch entering into the construction illustrated in Fig. 1. Fig. 3 shows a clutch-rod elevated to permit of the adjustment of the chair-back, and Fig. 4 is an end elevation of the clutch as seen in Fig. 2. Fig. 5 is a rear view of the reclining-chair illustrated in Fig. 1.

Like parts are indicated by similar characters of reference throughout the different figures.

I have illustrated a seat in the form of a Morris reclining-chair having a swinging back $a$, that has pivotal attachment at its lower horizontal edge to the chair-body. The arms $b$ of the chair are preferably each provided with a downwardly-extending hanger $c$, the hangers $c$ being preferably provided with bifurcated members or sides between which one end of a swinging locking member or link $d$ is pivotally secured. The other end of the locking member, which is similar to a cam in construction, is pivotally attached between the sides of a loop or collar $e$ by means of a screw $f$, passing through the upper ends of the loop, the screw $f$ being preferably employed, so that the collar $e$ may be removed from the link $d$ to permit of the insertion of the rod $g$ in said collar when the parts are assembled. The cam portion thus disposed between the sides of the loop $e$ is preferably eccentric with relation to its pivotal mounting, constituting a nose, which is adapted to engage the rod $g$, passing through the loop $e$. The clutch-rods have pivotal engagement with the swinging back of the seat. The rod $g$ passes between the cam and the bottom of the loop $e$, and when the said rod is in its lowered position a frictional engagement is effected between the eccentric nose, the clutch-rod, and the loop or collar, whereby the back of the chair is held in any position to which it may be adjusted. A forward adjustment of the back of the seat or chair-back may be readily secured, however, without manually adjusting the clutches, as the clutch-rods in moving forward escape binding engagement with the cams and have a tendency to rotate the same to move the points of greatest eccentricity thereof forward, whereby the spaces between the cams and the bottom of the loops are increased to permit of the free passage of the clutch-rods. This forward adjustment may be secured either by grasping the back or by grasping the clutch-rods.

To effect the rearward adjustment of the seat or chair back, the clutch-rods should be pressed slightly upward, when the members $d$ will be rotated about their points of pivotal engagement with the hangers $c$ to thereby remove the eccentric cam portions from engagement with the rods $g$ and permit of the rearward adjustment of the seat-back.

It will be observed that the noses or eccentric cam portions of the members $d$ project forwardly in order that the adjustments of the chair may be properly effected and maintained.

Many departures from the preferred embodiment of my invention may be made without departing from its spirit, and I do not therefore wish to be limited to the precise construction herein shown and described; but,

Having thus described my invention, I claim as new and desire to secure by Letters Patent—

1. The combination, in a clutch, with a rod-collar, of a hanger, a rod passing through the collar, a swinging cam carried by the hanger and provided with an eccentrical end or nose pivoted between the sides of the rod-collar, the cam being held in position to clutch and hold the rod automatically, substantially as described.

2. The combination with a hanger $c$, of a link $d$, pivoted at one end thereto, a cam being provided at the other end of the link, a collar $e$ pivoted to the link opposite the cam, and a rod $g$ passing through the collar and interposed between said cam and the opposite portion of the collar, substantially as described.

3. The combination with the swinging back of a seat, of a clutch-rod attached thereto, a swinging clutch member, the said clutch member being mounted to swing or rotate at one end upon an arm of the seat, the other end of the swinging clutch member being provided with a cam, and means for maintaining the said cam in engagement with the rod to secure the swinging back in the position to which it is adjusted, said means permitting disengagement between the cam and rod to permit of the adjustment of the back, substantially as described.

4. The combination with the swinging back of a seat, of a clutch-rod attached thereto, a swinging clutch member, the said clutch member being mounted to swing or rotate at one end upon an arm of the seat, the other end of the swinging clutch member being provided with a cam, and a collar having pivotal connection with that portion of the swinging clutch member where the said cam is located, the said collar and cam serving to engage the rod to maintain the back in the position to which it is adjusted, the swinging clutch member, by being rotated, serving to remove the cam portion thereof from engagement with the rod to permit of readjustment of the back, substantially as described.

5. The combination with the swinging back of a seat, of a clutch-rod attached thereto, a swinging clutch member, the said clutch member being mounted to swing or rotate at one end upon an arm of the seat, the other end of the swinging clutch member being provided with a cam, and a collar having pivotal connection with that portion of the swinging clutch member where the said cam is located, the said collar and cam serving to engage the rod to maintain the back in the position to which it is adjusted, the swinging clutch member, by being rotated, serving to remove the cam portion thereof from engagement with the rod to permit of readjustment of the back, the point of greatest eccentricity of the cam extending toward the front of the seat, the cam being located between the pivotal or swinging mounting of the swinging clutch member upon the arm of the seat and the front of the seat, substantially as described.

6. The combination with the swinging back of a seat, of a clutch-rod, a swinging clutch member mounted to swing or rotate at one end, the other end of the swinging clutch member being provided with a cam, and means for maintaining the said cam in engagement with the rod to secure the swinging back in the position to which it is adjusted, said means permitting disengagement between the cam and rod to permit of the adjustment of the back, substantially as described.

In testimony whereof I have signed my name to this specification in the presence of two subscribing witnesses.

CHRISTOPHER H. CLEMENT.

Witnesses:
   A. E. HARRIS,
   H. B. SNADER.